July 8, 1930. V. BEAUDETTE 1,770,124
AMUSEMENT ARENA
Filed Dec. 7, 1927
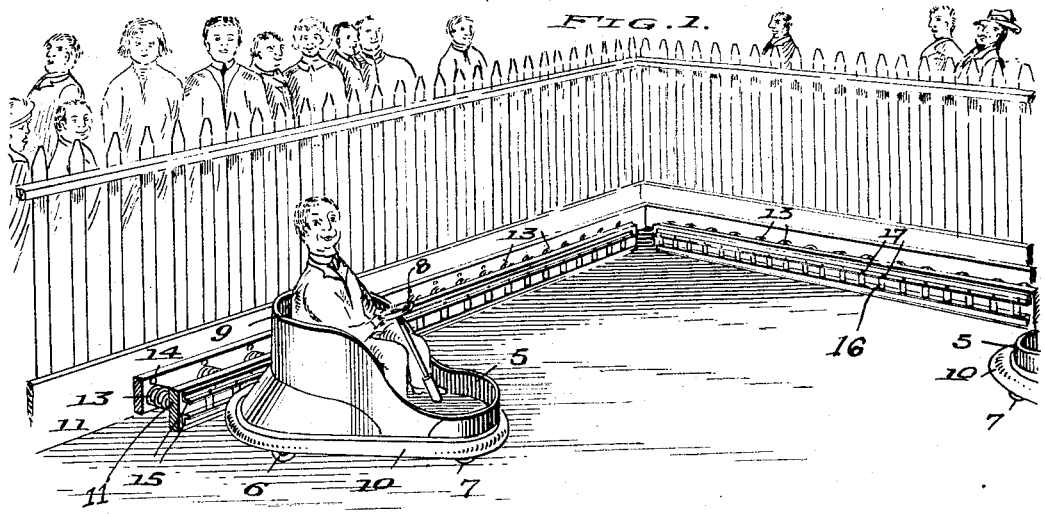
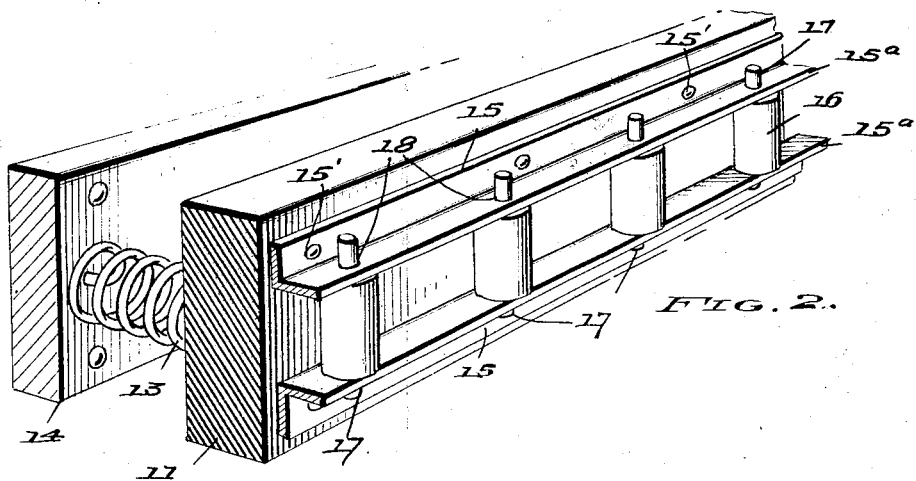
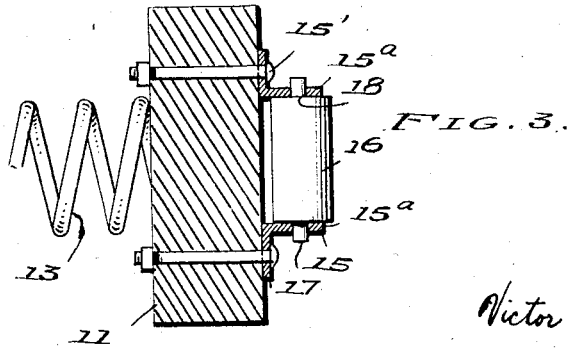
Inventor
Victor Beaudette
By
Attorneys Patented July 8, 1930

1,770,124

UNITED STATES PATENT OFFICE

VICTOR BEAUDETTE, OF OLD ORCHARD, MAINE

AMUSEMENT ARENA

Application filed December 7, 1927. Serial No. 238,396.

My invention relates to improvements in amusement arenas and particularly to the so called "Dodgen arenas" which are found at most amusement parks and which are characterized by a floor or other enclosed area, the border of which is defined by a yielding bumper board arranged adjacent the floor and against which the manually or mechanically operated bumper-encircled cars are liable to be run as they carouse about the floor guided by their occupants.

Despite the fact that each car has encircling it a rubber bumper, the cars are subjected to rather hard wear and the occupants considerably shaken up by more or less violent contact with the yielding bumper boards referred to hereinabove. Injury to the occupants frequently occurs from an unpremeditated glancing contact with the bumper board,—as for instance when attempting to avoid running into another car. Here, the rubber bumper frictionally engages the board and the car is swung violently around. Obviously the occupant or occupants even though nimble and athletically inclined are apt to be thrown out or bruised.

It is therefore the primary object of my invention to provide a novel and improved means for overcoming the aforenoted difficulty and give the cars a greater freedom of movement so as to enhance, rather than detract from the popularity of the car arena,— and at the same time to save wear and tear on the cars themselves and their occupants alike.

The invention further resides in,—and the foregoing objects are attained by, a novel combination and arrangement of parts to be hereinafter described and claimed, and in order that the same may be better understood, reference is had to the accompanying drawing forming a part of this specification. The drawing illustrates the now preferred embodiment of the inventive concept, but it is to be understood that various changes and modifications may be made in the structure there shown without however effecting a departure from the spirit and scope of the invention claimed.

In the drawing, wherein the same reference characters have been used to designate the same parts throughout the several views, Figure 1 is a perspective view illustrating one corner of an arena which incorporates my invention;

Figure 2 is perspective view of the bumper board drawn on enlarged scale, and

Figure 3 is a cross section through the bumper.

Referring specifically to the drawing, the car 5 is of more or less familiar form and is supported by a pair of small rear wheels 6 and a single front wheel 7,—the bearing of which latter is swively journalled in a vertical plane to be controlled by the steering wheel 8 in front of the occupant seat 9. The wheels are rubber tired as usual and the car body is encircled by a rubber bumper 10 as shown.

Referring now to the bumper board 11, this extends completely around the arena although for convenience only a portion of the arena and bumper board 11 are shown in the drawing. The bumper board is backed by coil or other springs 13, as shown, the outer ends of the springs abutting a beam or stop 14 arranged outwardly of and in parallelism with the bumper board. Of course, the specific beam or stop 14 is immaterial so far as concerns the invention herein.

The outer face of the bumper board 11 is provided with a pair of horizontal, vertically spaced angle bars 15, one flange of each of which is bolted as at 15' to board 11 in flat contact therewith. The bars 15 are right-angular in cross section, as shown, and hence the flanges 15ª which project outwardly in spaced horizontalism define a space for the reception of fibre rollers 16,—the pintles 17 of which are received in spaced bearing holes 18 in flanges 15ª. Each flange 15ª has a series of such holes 18 and corresponding holes of each flange are in alinement as shown. Needless to say, the line of rollers 16 extends around the entire arena and that the same are spaced the same distance above the floor as the bumpers 10 of the cars. Rollers 16 may be of any suitable material.

From the foregoing description, read in connection with the accompanying drawing, it is believed that the effect of the rollers will be readily apparent to those skilled in the art. Suffice it is to say, that when a car collides with the board 11 the rubber bumper will not stick as heretofore and swirl the car around; but quite to the contrary the car will glance or slide off the board along the rollers 16 in a slightly altered course and without appreciable diminishment of speed. Manifestly, the wear and tear on the cars will be greatly reduced and the safety and pleasure of the occupants materially increased.

Of course, fibre rollers or wheels can be used in lieu of the rubber tired wheels 6, 7. Since the invention is not concerned with any particular propelling means for cars 5 the usually employed trolley motor and current carrying ceiling screen have not been shown or described.

Having thus described my invention, what I claim as new and desire to secure by Letters Patent is:

In a car arena of the class described and defined by yielding buffers, the arena being adapted to receive cars having endless rubber buffers positioned at a height to engage said yielding buffer, spaced horizontal bearing members carried by said yielding buffers and having bearings therein spaced in the direction of the length of such members, rollers journalled in said bearings whereby to present a substantially endless antifriction surface, and the said bearing members being arranged at the proper elevation to position said rollers for engagement by the rubber bumpers of the car.

In testimony whereof I affix my signature.

VICTOR BEAUDETTE.